J. PEYRÉ.
VEHICLE DIRECTION INDICATOR.
APPLICATION FILED NOV. 25, 1919.
1,374,605.
Patented Apr. 12, 1921.
2 SHEETS—SHEET 2.
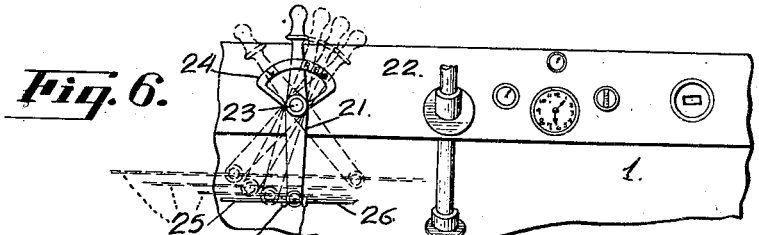
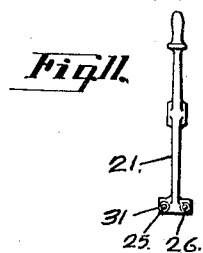
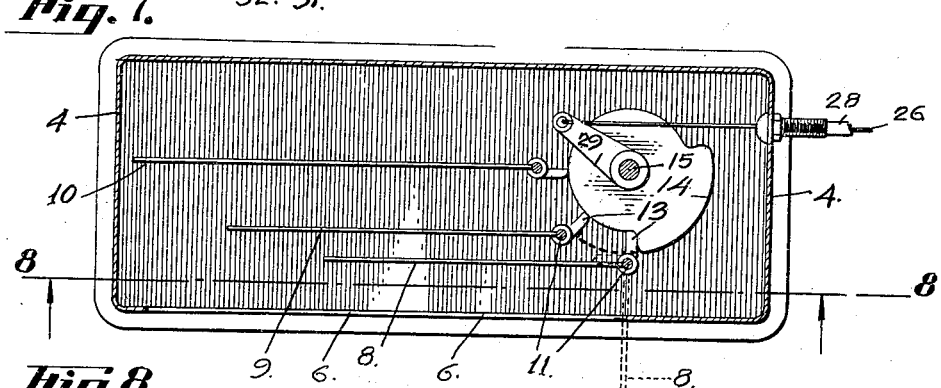
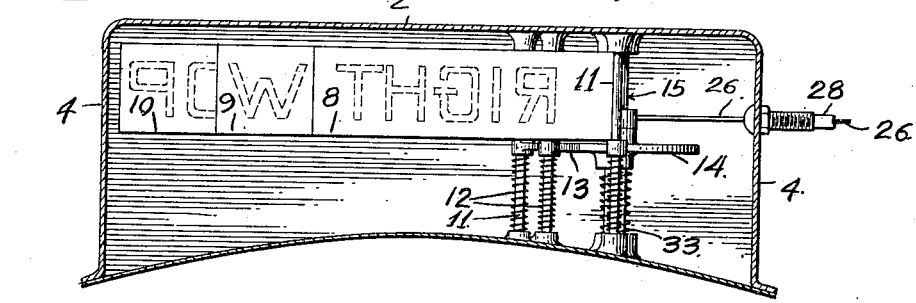
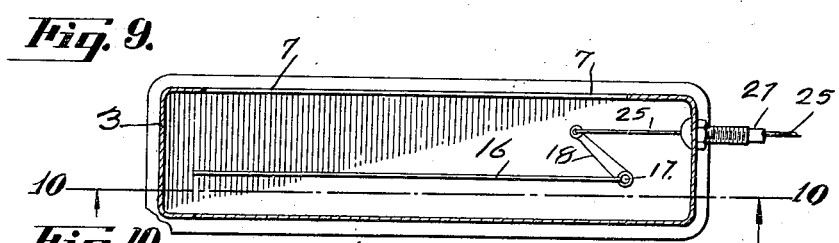
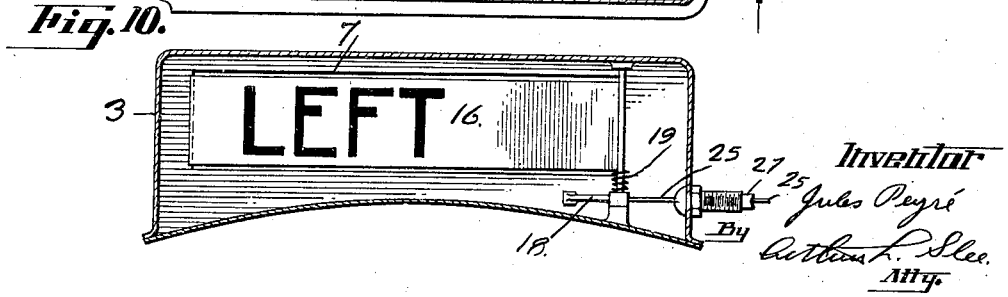
Inventor
Jules Peyré
By Arthur L. Slee
Atty.

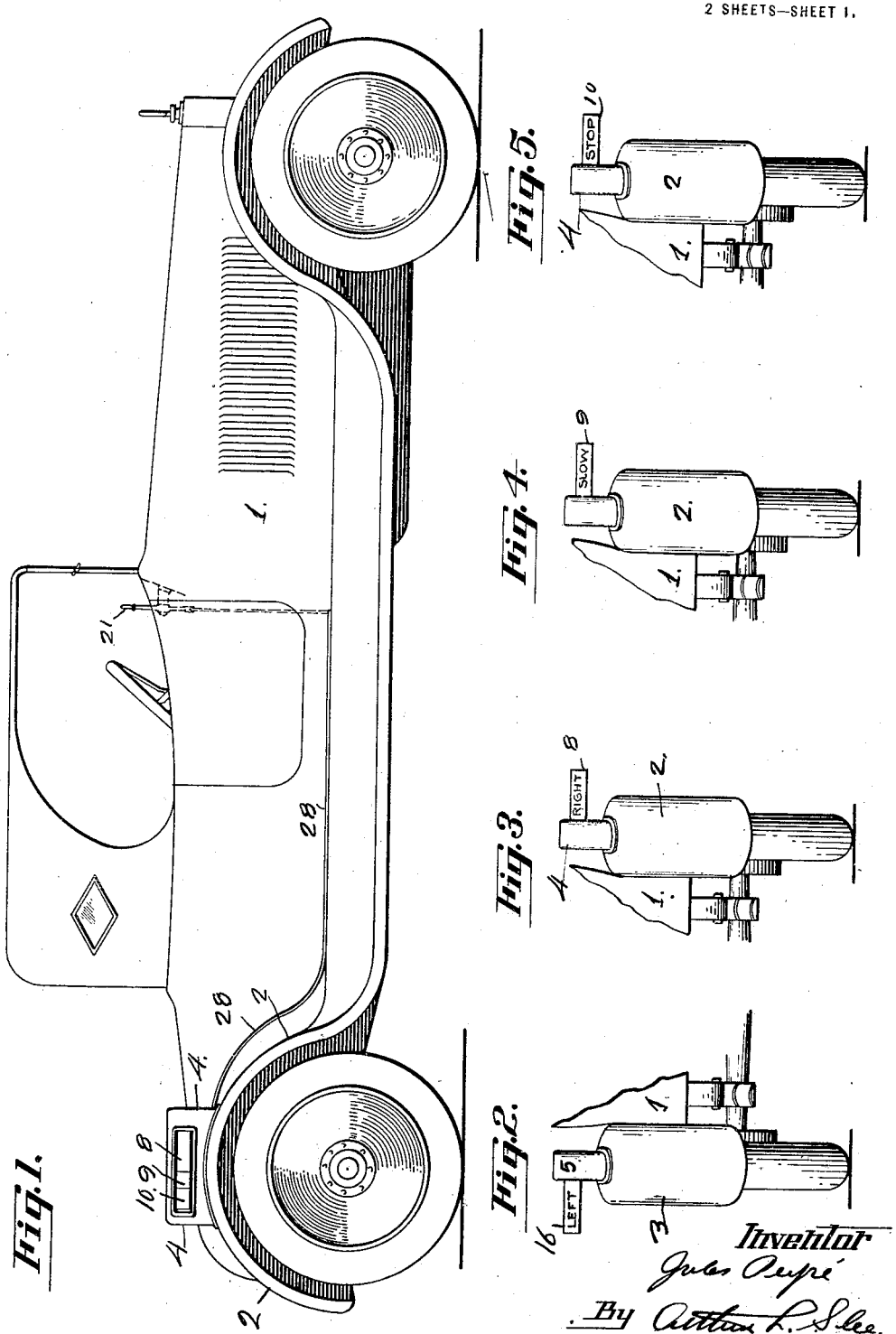

UNITED STATES PATENT OFFICE.

JULES PEYRÉ, OF SAN FRANCISCO, CALIFORNIA.

VEHICLE DIRECTION-INDICATOR.

1,374,605. Specification of Letters Patent. Patented Apr. 12, 1921.

Application filed November 25, 1919. Serial No. 340,677.

*To all whom it may concern:*

Be it known that I, JULES PEYRÉ, a citizen of the Republic of France, residing in the city and county of San Francisco and State of California, have invented a certain new and useful Improvement in Vehicle Direction-Indicators, of which the following is a specification.

My invention relates to improvements in a vehicle direction indicator wherein a plurality of signals operate to convey or indicate to following vehicles the intention of the operator of a preceding vehicle as regards turning, slowing down and stopping.

The primary object of the present invention is to provide a new and improved vehicle direction indicator.

A further object of the present invention is to provide a new and improved device of the character described having improved means for successively operating a plurality of signals in a certain order to indicate the intentions of the operator of a motor vehicle or the like to a following vehicle whereby the operator of said following vehicle may be governed accordingly.

I accomplish these several objects by means of the improved device disclosed in the drawings forming a part of the present specification wherein like characters of reference are used to designate similar parts throughout the said specification and drawings, and in which:

Figure 1 is a side elevation of a motor vehicle disclosing my invention applied thereto;

Fig. 2 is a broken view disclosing a portion of the left rear end of a motor vehicle with a portion of my improvement applied thereto;

Figs. 3 to 5 are similar views of the right rear portion disclosing the indicators successively displayed on that side of said vehicle;

Fig. 6 is a broken elevation of the dashboard of a vehicle disclosing the manner in which the device is controlled;

Fig. 7 is an enlarged broken horizontal sectional view through the right hand housing disclosing the normal arrangement of the signals;

Fig. 8 is a sectional view taken on line 8—8 of Fig. 7 in the direction indicated;

Fig. 9 is a horizontal sectional view of the left hand housing disclosing the arrangement of the single or fourth signal therein;

Fig. 10 is a vertical sectional view taken on line 10—10 of Fig. 9 in the direction indicated; and Fig. 11 is a detailed side elevation of the controlling lever.

Referring to the drawings the numeral 1 is used to designate a motor vehicle of any suitable type upon the rear fenders 2 and 3 of which are secured housings 4 and 5 provided with side windows 6 and 7 respectively.

Within the housing 2 there are three signals 8, 9 and 10 pivotally mounted by means of independent vertically disposed shafts 11 each provided with an independently operating spring 12 to normally retain said signals 8, 9 and 10 within the housing 2.

The signals 8, 9 and 10 have displayed thereon the words "Right," "Slow" and "Stop," respectively.

Each shaft 11 is provided with a lateral arm 13 adapted to be engaged by a cam 14 on a vertically disposed shaft 15, rotatably mounted within the housing 2 and adjacent the shafts 11, when said cam 14 is rotated to successively extend the signals 8, 9 and 10 laterally and thereby display successively the words "Right," "Slow" and "Stop," the purpose of which will hereinafter be more fully described.

The left housing 3 has pivotally mounted thereon a signal 16 bearing or displaying the word "Left," said signal 16 being also mounted upon a vertically disposed shaft 17 having an arm 18 and a spring 19 to normally retain the signal 16 within the housing 3 and thereby retain the word "Left" undisplayed.

A lever 21 is pivotally mounted on the dash 22 of the vehicle 1 as at 23 and adjacent a sector 24 having suitable indications thereon to indicate the position of the signals 8, 9, 10 and 16 for corresponding positions of said lever 21.

The lower end of the lever 21 is provided with parallel apertures within which are mounted the ends of controlling wires 25 and 26 leading through tubular conduits 27 and 28 to the arm 18 of the signal 16 in the housing 3 and an arm 29 connected to the cam 14 in the housing 2, respectively.

The upper end of the lever 21 moves to the right or left of the operator and adjacent the seat of said operator.

The wire 25 is provided with a stop 32 on the right side of the lower end of the lever 21 while the wire 26 is similarly supplied with a stop 32 on the left side of the lower end of said lever 21. By means of this novel arrangement when the upper end of the lever 21 is moved toward the right the lower end thereof engages the stop 32 of the wire 26 and pulls upon said wire meanwhile moving away from the stop 31 and of the wire 25 without operating the same. And when said lever is moved in the reverse direction the stop 31 of the wire 25 is engaged and that wire moved while the wire 26 remains stationary.

In operation when the operator of the vehicle is about to turn to the right he moves the upper end of the lever 21 toward the right and to the first index on the sector 24 which operation will pull the wire 26 and operate the cam 14 to engage the arm 13 on the signal 8 and thereby extend said signal laterally through the window 6 of the housing 2 and thereby display the word "Right" to following vehicles, thereby indicating the direction in which the foremost vehicle is about to turn. A further movement of the upper end of the lever 21 to the next index on the sector 24 will move the cam 14 a farther distance to engage the arm 13 of the signal 9 and thereby laterally extend said signal 9 through the window 6 of the housing 2 to display the word "Slow" to following vehicles.

A still further movement of said lever 21 will cause the cam 14 to engage the arm 13 of the signal 10 and thereby extend said signal laterally through the window 6 of the housing 2 and display the word "Stop" to following vehicles.

As each successive signal is displayed it covers the previously displayed signal so that the only one word or signal is displayed or visible to following vehicles.

It is obvious that the operator may move the lever 21 without stopping to the "slow" or directly to the "stop" signal without displaying either of the previous signals for any great period of time.

When the lever 21 is returned to normal position a spring 33 on the shaft 15 returns the cam 14 and arm 29 to normal position and simultaneously pulls the wire 26 through the tubular housing 28, thereby permitting the tensions of the springs 12 on the shafts 11 to return the signals 8, 9 and 10 within the housing 2 and retain said signals in an undisplayed position.

When about to turn to the left the operator of the vehicle moves the upper end of the lever 21 to the left thereby pulling the wire 25 and extending laterally through the window 7 of the housing 3 the signal 16 bearing the word "Left" as disclosed in Fig. 2 of the drawings. Upon return of the lever 21 to normal or neutral position the spring 19 returns the signal 16 within the housing 3 and retains said signal in an undisplayed position.

By means of the above described device, it is obvious that an operator of a motor vehicle may easily and readily indicate to following vehicles his intentions regarding the direction in which he is about to turn, or slow or stop.

The plurality of signals are normally undisplayed so as not to disconcert following vehicles and are only displayed intentionally by the operator of the vehicle.

Having thus described my invention, what I claim as new and desire to secure by Letters Patent is:

1. A vehicle direction indicator comprising a housing mounted upon one side of a vehicle; a plurality of signals pivotally mounted within the housing in longitudinally parallel position; a cam mounted within said housing and adapted to successively extend said signals laterally to displayed position, succeeding signals being arranged to superpose the preceding signals; and means for operating said cam from the dash of the vehicle.

2. A vehicle direction indicator comprising a housing mounted upon one side of a vehicle; a plurality of signals pivotally mounted within the housing in longitudinally parallel position; a cam mounted within said housing and adapted to successively extend said signals laterally to displayed position, succeeding signals being arranged to superpose the preceding signals; an operating lever pivotally mounted upon the dash of the vehicle; and a cord operatively connecting said operating lever and the cam, whereby said cam may be operated to display the desired signal.

3. A vehicle direction indicator comprising a housing mounted upon one side of a vehicle; a plurality of signals pivotally mounted within the housing in longitudinally parallel position; a cam mounted within said housing and adapted to successively extend said signals laterally to displayed position, succeeding signals being arranged to superpose the preceding signals; an operating lever pivotally mounted upon the dash of the vehicle; and a cord operatively connecting said operating lever and the cam, whereby said cam may be operated to display the desired signal; a second housing mounted upon the opposite side of the vehicle; a single signal pivotally mounted within said second housing; and a cord connecting said single signal with the actuating lever for extending said signal to displayed position.

4. A vehicle direction indicator comprising a housing mounted upon one side of a vehicle; a plurality of signals pivotally mounted within the housing in longitudinally parallel position; a cam mounted within said housing and adapted to successively extend said signals laterally to displayed position, succeeding signals being arranged to superpose the preceding signals; an operating lever pivotally mounted upon the dash of the vehicle; and a cord operatively connecting said operating lever and the cam, whereby said cam may be operated to display the desired signal; a second housing mounted upon the opposite side of the vehicle; a single signal pivotally mounted within said second housing; and a cord connecting said single signal with the actuating lever for extending said signal to displayed position; and means for normally retaining the signals within the housings.

5. A vehicle direction indicator comprising a housing mounted upon each side of a vehicle; three signals pivotally mounted within one of the housings in longitudinally parallel position; a single signal pivotally mounted in the opposite housing; a cam mounted in the first mentioned housing adapted to successively extend the signals laterally therefrom to displayed position, succeeding signals being arranged to superpose the preceding signals; an operating lever pivotally mounted upon the dash of the vehicle; cords connecting said operating lever with the single signal and with the cam, whereby movement in one direction operates to extend the single signal, and movement in the opposite direction actuates said cam to extend the plurality of signals successively until the desired signal is displayed; and means for normally retaining the signals within the housings.

In witness whereof I hereunto set my signature.

JULES PEYRÉ.